DATA PRINTER WITH FLEXIBLE PRINT WHEEL

Original Filed July 12, 1965 6 Sheets-Sheet 1

INVENTORS.
HUGH L. CLARY
JOHN G. CLARY
BY
ATTORNEY.

DATA PRINTER WITH FLEXIBLE PRINT WHEEL

INVENTORS.
HUGH L. CLARY
JOHN G. CLARY
BY
ATTORNEY.

INVENTORS.
HUGH L. CLARY
JOHN G. CLARY
BY
ATTORNEY.

April 16, 1968 H. L. CLARY ET AL 3,378,127

DATA PRINTER WITH FLEXIBLE PRINT WHEEL

Original Filed July 12, 1965 6 Sheets-Sheet 4

INVENTORS.
HUGH L. CLARY
JOHN G. CLARY
BY

ATTORNEY.

DATA PRINTER WITH FLEXIBLE PRINT WHEEL

Original Filed July 12, 1965 6 Sheets-Sheet 5

INVENTORS.
HUGH L. CLARY
JOHN G. CLARY
BY

ATTORNEY.

INVENTORS.
HUGH L. CLARY
JOHN G. CLARY
BY
ATTORNEY.

3,378,127

DATA PRINTER WITH FLEXIBLE PRINT WHEEL

Hugh L. Clary, San Marino, and John G. Clary, Pasadena, Calif., assignors to Clary Corporation, San Gabriel, Calif., a corporation of California Continuation of abandoned application Ser. No. 471,116, July 12, 1965. This application Aug. 29, 1966, Ser. No. 575,904
3 Claims. (Cl. 197—55)

ABSTRACT OF THE DISCLOSURE

The data printer is provided with a flexible print wheel having type characters and detent formations around its rim. A guided actuator is engageable with certain of the detent formations on the side of the wheel adjacent the printing station to impress a selected type character against a record medium located at the print station.

This application is a continuation of Ser. No. 471,116, filed July 12, 1965, now abandoned.

This invention relates to data printers and has particular reference to printers which may be remotely controlled, such as are used in conjunction with computers, telegraphic systems, telemetry systems, etc., wherein information is usually transmitted to the printer in coded form.

The invention is particularly applicable to page printers, although certain basic aspects of the invention may also be employed in tape or strip printers.

Data printers employing rotary print wheels have generally been found to be more satisfactory than printers using type bars, such as are found in typewriters, largely because of the substitution of one, or a few at the most, print wheels for a large number of type bars and associated linkages. However, heretofore, such print wheel printers generally incorporated a print hammer which strikes against the rear of the paper or other record medium, carrying it into impact with a printing ribbon and the print wheel. Although such printers are generally satisfactory when printing one or two pieces of paper, problems are encountered in printing a relatively large number of superimposed papers with interleaved carbon papers or when printing on pads, passbooks or the like, of any appreciable thickness.

Although other print wheel printers have incorporated means for bodily moving the print wheel out of mesh with its drive mechanism and into printing contact with the paper, this has not proved satisfactory in high speed data printers, due largely to the relatively large mass found in the print wheel and its associated mechanism which must be moved each time a print is effected.

It therefore becomes a principal object of the present invention to provide a relatively high speed data printer incorporating a rotatable type or print wheel.

Another object is to provide a data printer incorporating print wheels in which the mass of the parts to be moved during a printing operation is reduced to a minimum.

Another object is to provide a relatively high speed data printer capable of printing on record media of any size, thickness, and mass.

Another object is to provide a low cost serial page printer which is capable of relatively high speeds.

The manner in which the above and other objects of the invention are accomplished will be readily understood on reference to the following specification when read in conjunction with the accompanying drawings, wherein.

*General arrangement*

Figure 1:
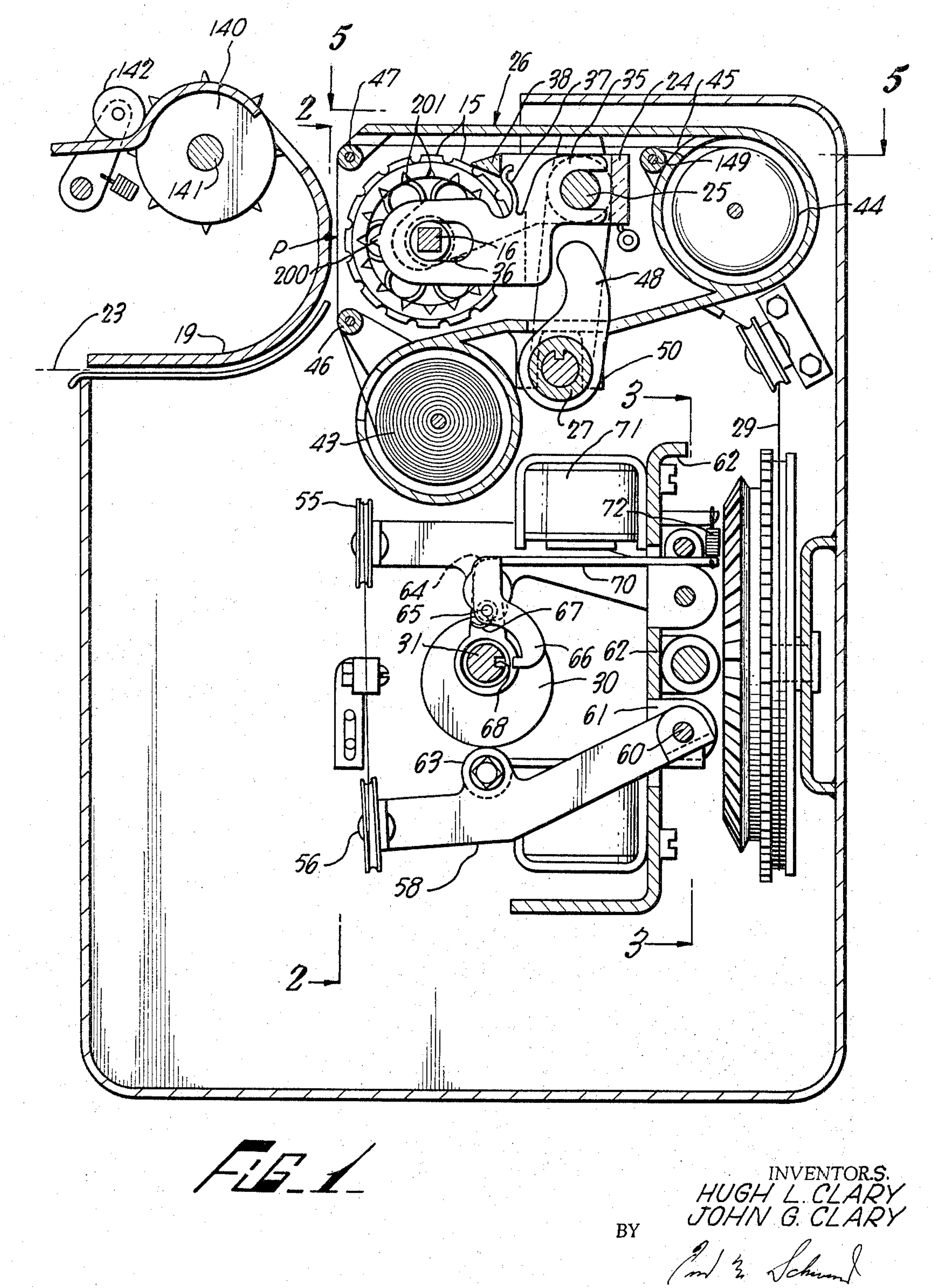
FIG. 1 is a transverse sectional view through a page printer embodying a preferred form of the present invention.
Figure 2:
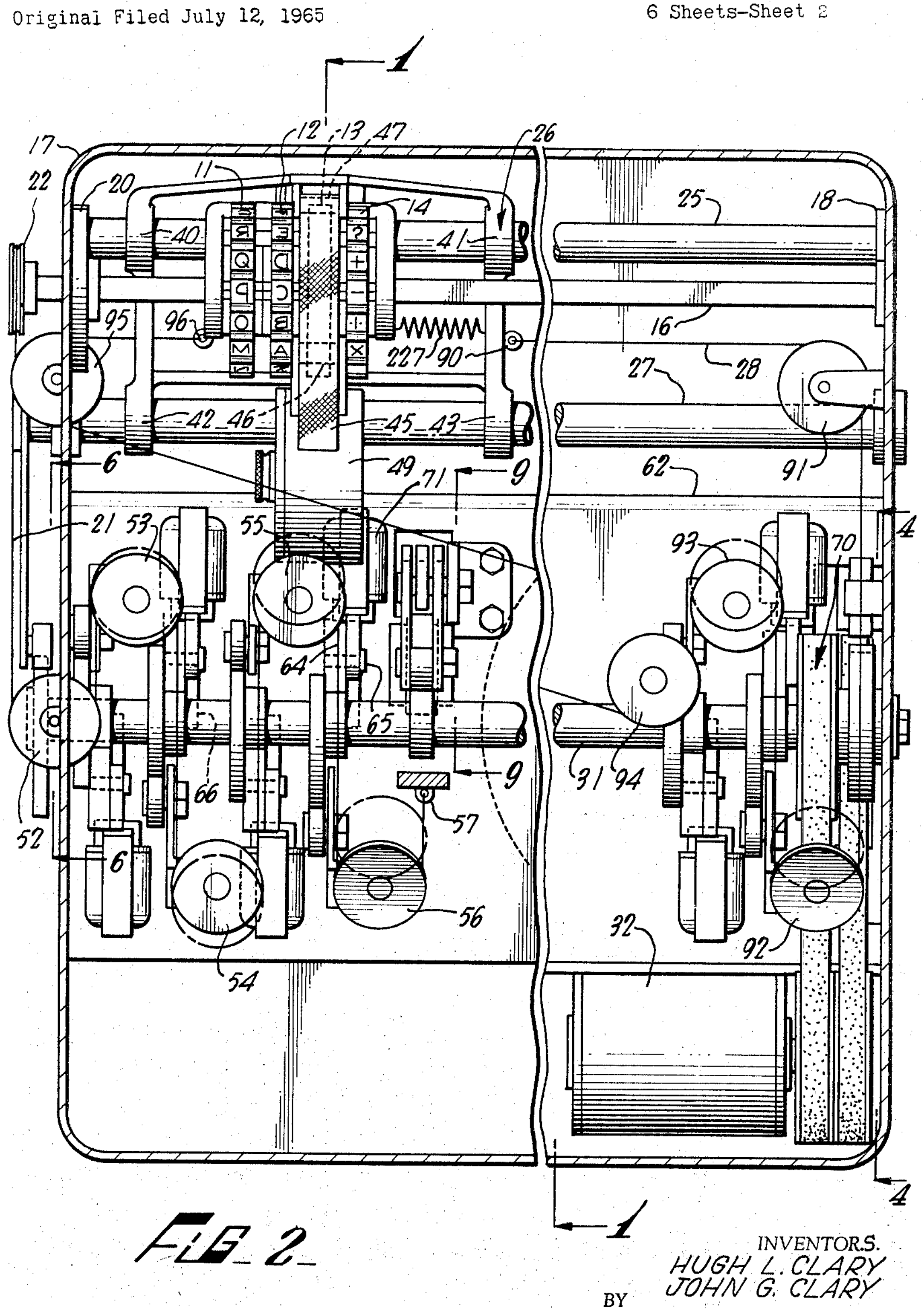
FIG. 2 is a sectional view through the printer and is taken substantially along the line 2—2 of FIG. 1.

Referring to the drawings, and particularly to FIGS. 1 and 2, the printer comprises a set of four print wheels 11, 12, 13 and 14, located side by side, and each having sixteen embossed type characters 15 spaced around the periphery thereof. The print wheels are slideably splined on a square shaft 16 which is rotatably mounted in bearings formed in side walls 17 and 18 of the printer.

The shaft 16 is urged rotatably toward an initial position by a spiral torsion spring 20, having one end attached to the shaft and the opposite end suitably attached to the side wall 17. However, the shaft is rotated in either direction from a neutral position under control of a cable 21, one end of which is attached to and wrapped around a wheel 22 attached to the shaft. As will be described in detail later, the cable 21 is differentially advanced in either direction by a pulley system in accordance with the particular character to be printed, whereby to rotate the wheel 22 to locate a selected line of type characters on the print wheels at a printing station P.

A stationary platen 19 extends between the side walls 17 and 18 of the printer and guides a paper web or sheet 23 upwardly past the printing station.

*Print wheel and carriage construction*

The print wheels 11, 12, 13 and 14 are constrained to move as a unit along the shaft 16 by a U-shaped carriage 24 which embraces the wheels and is slideably supported on a stationary rod 25 also supported between the side walls 17 and 18.

The print wheel carriage 24 is slideable relative to a main printhead carriage 26 which is also slideable along the rod 25 and along a second shaft 27, also rotatably supported by bearings carried by the side walls 17 and 18.

Figure 8:
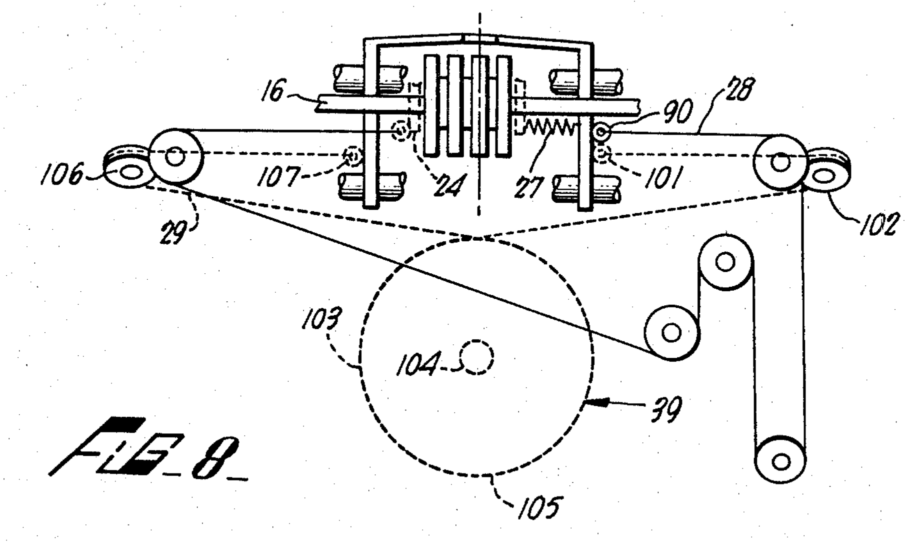
FIG. 8 is a diagrammatic view illustrating the cable system for concurrently effecting character spacing of the printhead and selection of different print wheels.

The print wheel carriage 24 is urged to the right relative to the main carriage 26 by a tension spring 227 extending between the two carriages. However, the print wheel carriage is shiftable relative to the main carriage under control of a cable 28 (see also FIG. 8) to locate any one of the print wheels in position for printing in accordance with the particular character to be printed. This is effected by a pulley system, to be described hereinafter.

Figure 3:
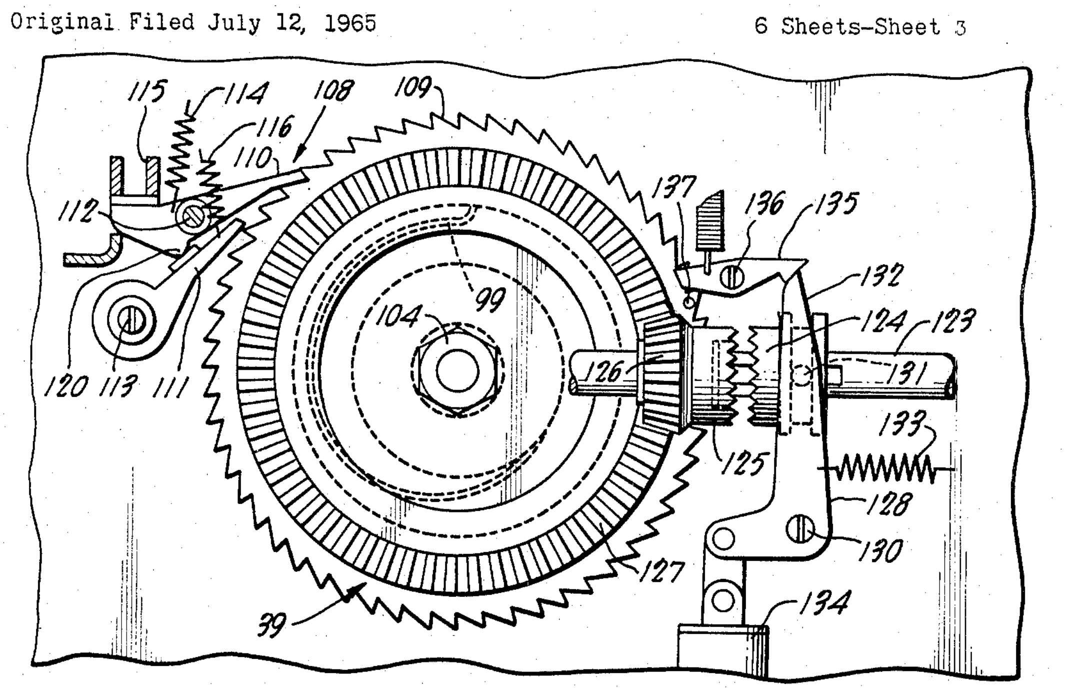
FIG. 3 is a sectional view illustrating part of the carriage shifting mechanism and is taken substantially along the line 3—3 of FIG. 1.

As an incident to each printing operation, the printhead carriage is stepped one character space to the right by a cable 29 through a spring driven drum generally indicated at 39 (FIGS. 1 and 3).

Figure 7:
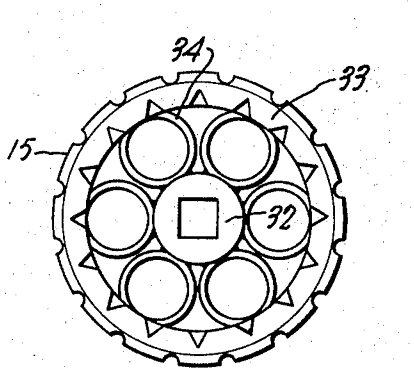
FIG. 7 is a detailed side view of one of the print wheels.

The print wheels 11–14 are formed of a suitable flexible plastic or similar material and each comprises a hub 32 (FIGS. 5 and 7), a relatively stiff rim 33 and relatively flexible arcuate spokes 34.

A U-shaped hammer 35 slideably embraces each print wheel and is guided for movement toward and away from the printing station P by the rod 25 and by the hub 32 of the respective print wheel. For this purpose, the hub is embraced by elongated slots 36 in the forwardly extending arms of the hammer.

Normally, the hammers are held in their rearward illustrated positions by spring fingers 37 thereon which engage a cross piece 38 formed integral with the wheel carriage 24.

It will be noted that the side arms of the hammer terminate in inwardly projecting tips 200 which are adapted to engage in detenting notches 201 formed in the rim of the associated print wheel. Thus, the print wheel will be accurately located in printing position as it moves into printing contact.

The main printhead carriage 26 comprises a rectangular frame in which are formed spaced bearings 40 and 41 slideable over the rod 25 and bearings 42 and 43, slideable over the shaft 27. The central portion of the main carriage forms a housing 49 for a printing ribbon which is fed between a pair of spools 43 and 44, the spools being located in cylindrical recesses formed in the housing portion. The ribbon extends from the spool 43, around guide roller 46, past the print station P, and around a guide roller 47, from whence it passes rearwardly over a guide roller 149 onto the spool 44.

A hammer actuator 48 engageable with any of the hammers is slideably keyed on the shaft 27 and is constrained to travel with the main printhead carriage by guide shoes 50 which extend downwardly from the main carriage and slideably engage opposite ends of the actuator.

*Print wheel rotating means*

The print wheels are rotated to position a line of type characters at the printing station, one of which is to be used for printing, by the cable 21 (FIG. 2), which extends downward from the wheel 22, around a guide pulley 52, and thence serially around four positioning pulleys 53, 54, 55 and 56, the end of the cable being anchored to part 57 of the printer frame.

As shown in FIG. 1, each of the pulleys, i.e. 56, is mounted on an arm 58, pivoted at 60 to a bracket 61 extending from a Z-shaped brace 62. The latter extends across the machine and is suitably supported by the side walls 17 and 18. Each arm 58 carries a cam follower roller 63 in rolling engagement with one of a series of cams 30 rotatably mounted on a cam shaft 31. Integral with each cam is an extension 64, to which is pivoted at 65 a clutch pawl 66. A torsion spring 67 urges the pawl toward clutching engagement with a keyway 68 formed in the shaft 31 but is normally prevented from doing so by the armature 70 of an electromagnet 71 suitably supported by the brace 62.

Upon energization of a magnet 71, its armature 70 will be withdrawn against the action of a tension spring 72, permitting the pawl 66 to clutch the shaft and freeing the extension 64 for rotation.

The cams 30 are substantially in the form of eccentrics and have different throws, the lengths of such throws being related to each other in accordance with the binary progression series of 1, 2, 4 and 8. Accordingly, by clutching one or more of the cams 30 to the cam shaft 31 and by rotating the shaft through one revolution, the cable 21 will be effectively lengthened or shortened and, consequently, the print wheels will be rotated from an initial position to any of sixteen different character positions.

Figure 4:
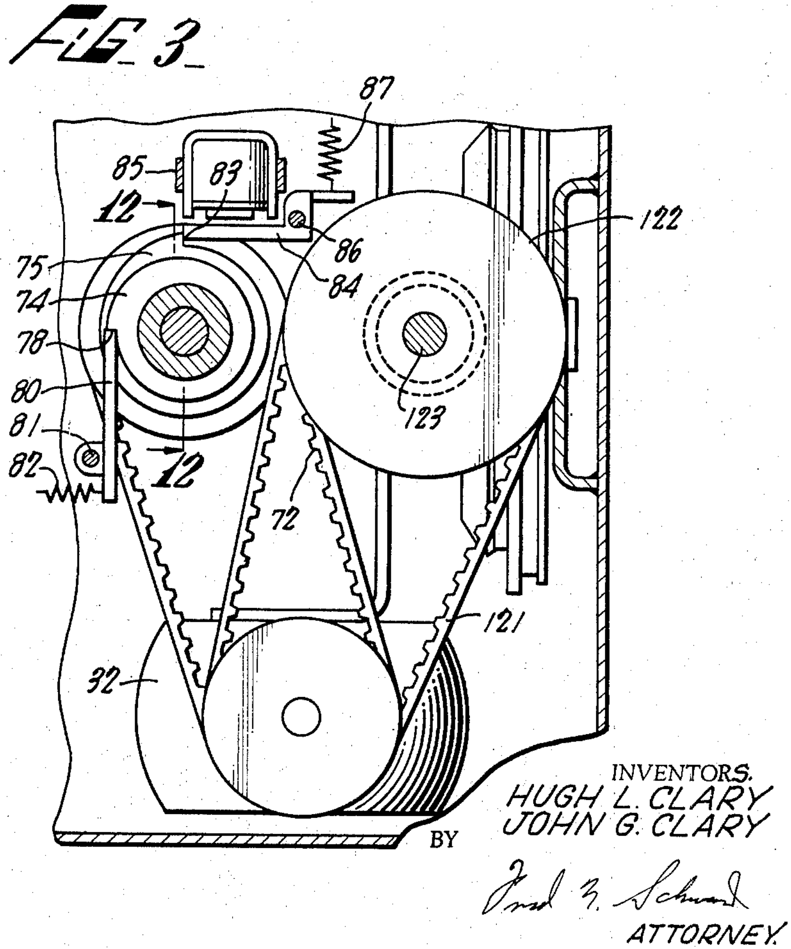
FIG. 4 is a sectional view illustrating part of the drive mechanism for the printer and is taken along the line 4—4 of FIG. 2.
Figures 11, 12:
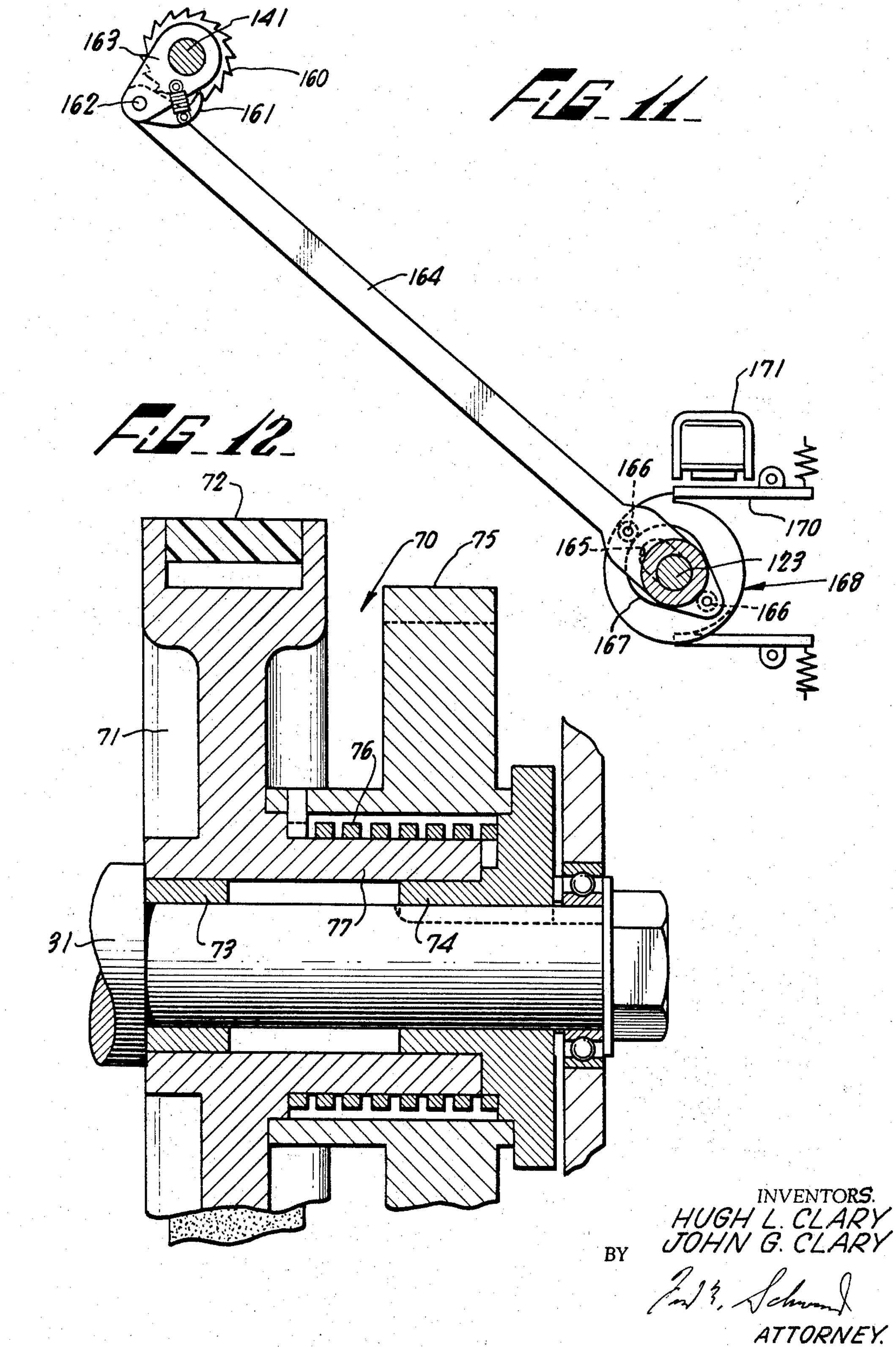
FIG. 11 is a sectional view illustrating the mechanism for incrementally advancing the paper.
FIG. 12 is an enlarged sectional view through the one-revolution spring clutch and is taken along line 12—12 of FIG. 4.

The shaft 31 is rotatably mounted in bearings carried by the side walls 17 and 18 and is adapted to be driven by the motor 32 through a one-revolution spring-type clutch, generally indicated at 70 (FIGS. 2 and 12). The latter is of the type basically shown in FIGS. 33 and 34 of the U.S. Patent to Blodgett No. 2,700,446, issued on Jan. 25, 1955, and comprises a pulley member 71 entrained with the motor 32 by an endless cog belt 72 (see also FIG. 4). The pulley member 71 is rotatably mounted at one end on a bearing bushing 73 and at the other end on a hub member 74, keyed to the shaft 31. A clutch member 75 is rotatably mounted on the pulley member 71 and the hub member 74 and has secured thereto one end of a helical clutch spring 76. The latter is adapted to grip a hub portion 77 of the pulley member and has its opposite end anchored to the hub member 74.

The hub member 74 has a latching shoulder 78 (FIG. 4) engageable by a backup preventing pawl 80. The latter is pivoted at 81 and urged clockwise by a spring 82. Likewise, the clutch member 75 has a latching shoulder 83 engageable by the armature 84 of an electromagnet 85. The armature is pivotally supported at 86 and urged counterclockwise by a tension spring 87 to normally engage the shoulder 83 and thus hold the clutch spring 76 from gripping the pulley member 71.

When the electromagnet 85 is energized, its armature 84 releases the clutch member 75, permitting the spring 76 to contract and thereby grip the pulley member 77 to transmit rotation to the shaft 31 through the hub member 74. Upon completing a full revolution, the shoulder 83 re-engages the armature 84 and as the momentum of the shaft 31 and parts carried thereby continue to advance until the pawl 80 snaps into latching engagement with the shoulder 78, the spring 76 expands slightly to release its grip on the pulley member 71.

From the above it will be seen that by energizing one or more of the electromagnets 71 and the clutch magnet 85, the type wheels will be advanced to selected type character positions and then returned.

It will be noted on reference to FIGS. 1 and 2 that the cam 30 associated with the pulley 56 has a throw of eight increments and is normally held in a position with its high point in engagement with its cam follower roller while the other cams having throws of one, two and four increments, respectively, are normally held with their low points in engagement with their respective cam follower rollers.

Thus, the print wheels will normally be held in rotated positions midway between their extremes and each will be advanced in either direction a maximum of eight increments depending on which electromagnet or electromagnets 71 are energized. For example, considering a printing wheel, i.e., 13, carrying numeral type characters and a case in which the digit 8 is to be printed, the "8" magnet 71 associated with pulley 56 is energized. The associated cam 30 is clutched to the shaft and the shaft is rotated, allowing the cable 51 to be effectively lengthened eight increments and the shaft 16 rotated in one direction by the spring 20 to a position wherein the type character "8" is registered at the printing station. If the digit "3" is to be printed, the "1" and "2" electromagnets 71 are energized to clutch their respective cams to the shaft 31 to effectively shorten the cable and thus rotate the print wheels three increments in the opposite direction to register the digit "3." On the other hand, if the digit "9" is to be printed, the "1" and "8" electromagnets are energized, causing the pulley 56 to effectively lengthen the cable eight increments while the pulley 53 effectively shortens the cable 21 one increment, thereby in effect rotating the print wheels seven increments in a retrograde direction to register the type character "9" on the digit print wheel at the printing station.

*Print wheel selecting means*

The print wheels are shiftable axially to locate that wheel containing a selected type character to be printed in position behind the printing ribbon 45. For this purpose, the cable 28 (FIGS. 2 and 8) is attached at 90 to the main printhead carriage 26 and is reeved over guide roller 91, around two positioning pulleys 92 and 93, around two guide rollers 94 and 95, and is attached at 96 to the print wheel carriage 24.

The pulleys 92 and 93 are supported by cam follower arms similar to the arms 58 which are actuated by cams similar to cams 30 under control of electromagnets similar to the electromagnets 71. The cam associated with pulley 93, when clutched to the shaft 31, is effective to move the pulley 93 outwardly to effectively shorten the cable 28 one increment to shift the print wheel carriage from its normal position in which print wheel 13 is in printing position behind the printing ribbon 45 to a position in which the wheel 14 is located in printing position. Such cam is normally located with its low point in contact with the cam follower roller.

The cam associated with pulley 92 is effective to cause pulley 92 to effectively lengthen the cable 28 two increments to enable spring 27 to shift the print wheel carriage 24 to a position in which the print wheel 11 is located in printing position. Thus, also, when the cams associated with pulleys 92 and 93 are clutched, the cable 28 will be effectively lengthened one increment to locate the print wheel 12 in printing position.

*Printhead shifting*

The printhead carriage 26 is stepped across the machine one character space at a time as an incident to each print operation and for this purpose the cable 29 (FIGS. 1 and 8) is attached at 101 to the carriage and is guided over a guide roller 102 from whence it is wrapped around the spring drum 39, the latter being rotatably mounted on a frame stud 104. A torsion spring 99 within the drum 39 tends to rotate the same in a counterclockwise direction. The cable is attached to a midpoint 105 on the drum and is guided around a guide roller 106 and attached at its opposite end 107 to the carriage 26.

An escapement mechanism, generally indicated at 108 (FIG. 3) is provided to cause the spring drum to advance the carriage 26 one character space as an incident to each print operation. The escapement mechanism comprises a pair of pawls 110 and 111 pivotally supported at 112 and 113, respectively. A spring 114 normally biases the pawl 110 into engagement with the escapement teeth 109 on the drum 39 while a spring 116 of less force biases the pawl 111 out of engagement with such teeth.

Figure 9:
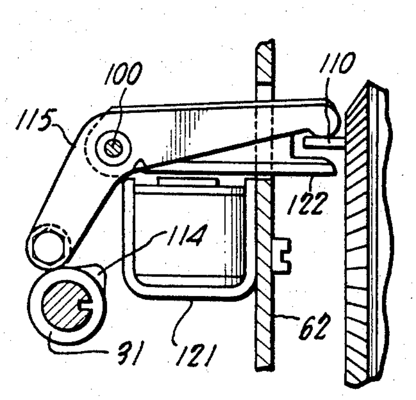
FIG. 9 is a sectional view taken substantially along the line 9—9 of FIG. 2, showing part of the controls for effecting shifting of the printhead.

During each revolution of the shaft 31, and after the print operation, to be described later, has occurred, a cam 114 (FIG. 9) on the shaft 31 actuates a cam follower 115, pivotally supported at 100, to rock the pawl 110 out of pawling engagement with the drum 39. At the same time, a lobe 120 on the pawl 110 forces the pawl 111 into engagement with a succeeding tooth on the drum, thus causing an escapement of the drum through one increment. As the lobe 120 passes, the spring 114 is effective to re-engage the pawl 110 and permit spring 116 to withdraw the secondary pawl 111.

For the purpose of blank spacing the carriage 26, an electromagnet 121 (FIG. 9) is mounted on the brace 62 and cooperates with an armature 122 pivotally supported at 100 and having a portion overlying the pawl 110. Accordingly, energization of the magnet 121 will actuate the pawl 110 and directly cause advancement of the carriage one character space.

*Carriage return*

The printhead carriage 26 is returned to its lefthand position under power derived from the motor 32, and for this purpose the motor is entrained through an endless cog belt 121 with a sprocket wheel 122 secured to a jack shaft 123 which is therefore driven continuously.

The driving element 124 (FIG. 3) of a jaw clutch is slideably keyed on the shaft 123 and is adapted to engage the driven element 125 of such clutch. Such driven element is rotatably mounted on the shaft 123 and forms a bevel gear pinion 126 continuously maintained in mesh with a bevel gear formation 127 on the spring drum 39.

A clutch shifter lever 128 is pivotally supported at 130 and is provided with a stud 131 engaging a peripheral groove 132 in the jaw clutch member 124. A spring 133 normally holds the shifter 128 and clutch member 124 in disengaged position, shown in FIG. 3. However, upon energization of a solenoid 134, the shifter lever 128 will be rocked counterclockwise to engage the clutch member 124 with the driven member 125 to rotate the drum 39 clockwise to accordingly return the carriage 26 to its lefthand position and to concurrently wind the spring 99. The shifter lever 128 is latched in actuated position by spring urged latch 135 pivotally supported at 136. As the carriage reaches its lefthand position, a pin 137 on the spring drum engages the latch 135 to release the shifter lever 128 so as to disengage the clutch.

*Printing operation*

Figure 6:
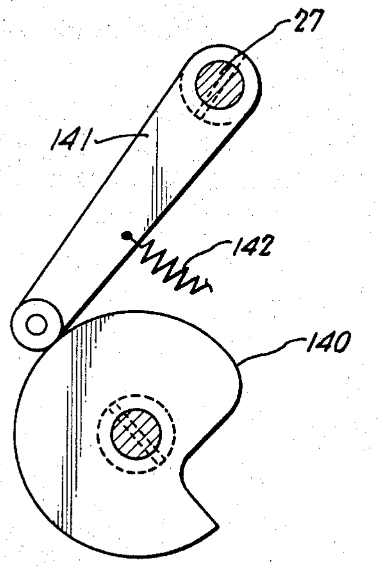
FIG. 6 is a transverse section view illustrating part of the print actuating mechanism.

Printing is effected when the cam or cams 30 for one or more of the print wheel positioning pulleys 53 to 56, as well as the cams for the print wheel shifting pulleys 92 and 93, reach the extremes of their throws. For this purpose, a cam 140 (FIG. 6) is fastened on the cam shaft 31 to actuate a cam follower arm 141 fastened to the rock shaft 27 (see also FIG. 1). When the shaft 31 has rotated approximately 180 degrees, the arm 141 will drop from the high point of cam 140, under the action of a tension spring 142, thereby rocking the shaft 27 and hammer actuator 48 (see also FIG. 1) counterclockwise to engage the aligned hammer 35 and thus deflect the associated type wheel transversely of the shaft 16 into printing contact with the paper 23. Immediately thereafter, the cam 140 will return an arm 141, shaft 27 and actuator 48 sufficiently to permit shifting of the carriages 24 and 26, preparatory to the next print operation.

*Printing ribbon feed and reverse mechanism*

Figure 5:
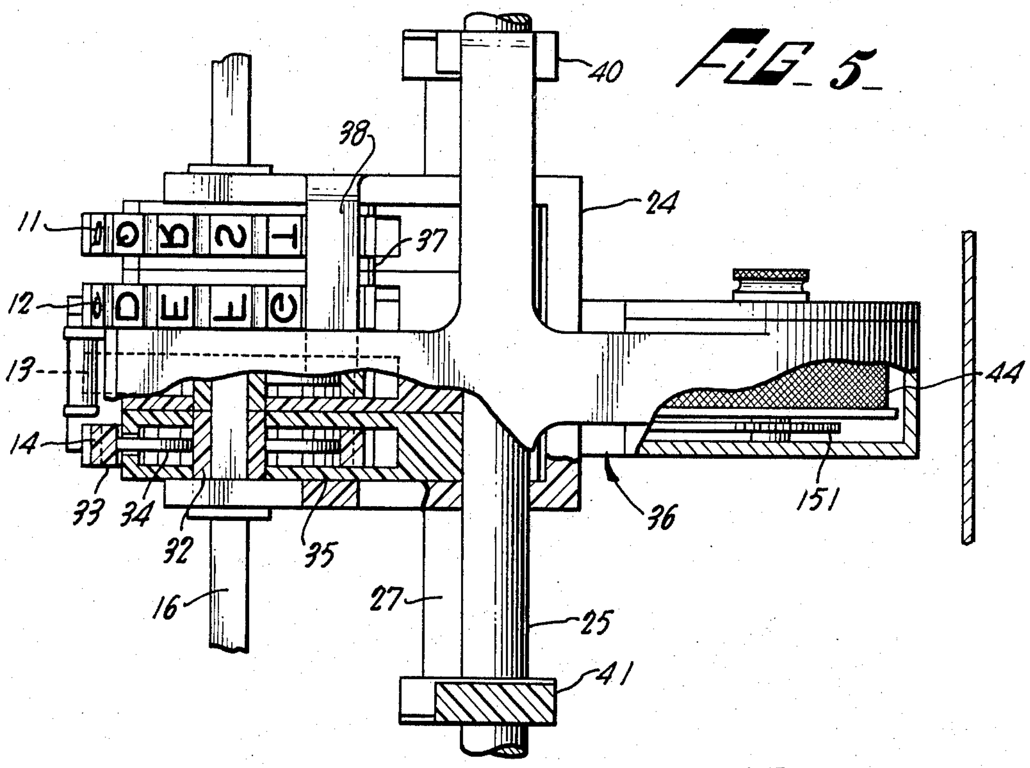
FIG. 5 is an enlarged plan view, partly in section, of the printhead and is taken substantially along the line 5—5 of FIG. 1.
Figure 10:
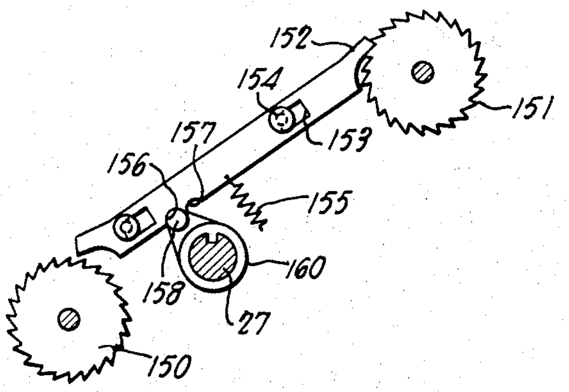
FIG. 10 is a sectional view illustrating the printing ribbon advancing and reversing mechanism.

As noted before, the printing ribbon is advanced from one to the other of the ribbon spools 43 and 44, and for this purpose the latter spools have attached thereto ratchet wheels 150 and 151, respectively (see also FIGS. 5 and 10). The ends of the ribbon are also firmly attached to respective ones of the ribbon spools.

A double ended pawl 152 is provided in cooperative relation with the ratchet wheels. Enlarged slots 153 in the pawl embrace frame studs 154 extending from one side of the housing 36 on the printhead carriage 26. A spring 155 urges the pawl into a position wherein one of two detent notches 156 and 157 embraces a stud 158 carried by an arm 160 formed integral with the hammer actuator 48 and movable along the shaft 27 with the carriage 26.

When the pawl 152 is in its position shown in FIG. 10, counterclockwise and return movement of the shaft 27 to effect a print operation will cause the pawl to advance the ratchet wheel 151 and spool 44 one increment in a clockwise direction.

When the ribbon is exhausted from the spool 43, the spool 44 and ratchet wheel 151 will be prevented from further rotation by the pawl 152 and accordingly, as increased resistance to rotation is presented by the ratchet wheel 151, the arm 160 will snap from notch 156 into notch 157. Now, upon subsequent rocking of the shaft 27, the pawl 152 will engage and advance the ratchet wheel 150 and spool 43 counterclockwise to advance the ribbon from the spool 44.

*Paper spacing*

The paper is preferably perforated along its opposite edges to be engaged by feed sprockets 140 secured to a sprocket shaft 141. Spring pressed pressure rollers 142 normally hold the paper in engagement with the sprockets 140.

The paper is advanced from one print line to the next and for this purpose a ratchet wheel 160 (FIG. 11) is secured to the shaft 141 and is engaged by a spring pressed pawl 161 pivotally supported on a stud 162 carried by an arm 163 which is freely pivotal on the shaft.

A link 164 is also pivotally connected to the stud 164 at its upper end and is provided with an elongated slot 165 at its lower end which embraces the jack shaft 123.

Rollers 166 carried by the link 164 engage opposite sides of a cam 167 mounted on the side of a spring clutch generally indicated at 168. The latter is basically similar to the spring clutch 70, shown in FIG. 12, and is controlled by the armature 170 of an electromagnet 171. Thus, when a pulse is applied to magnet 171 the clutch 168 will be engaged to cause cam 167 and linkage actuated thereby to incrementally advance the sprocket wheels.

*Operation*

Upon application of coded signals in the form of pulses to one or more of the electromagnets 71, certian of the cams 30 are clutched to the shaft 31, depending on the particular character to be printed. Concurrently, or subsequently, the clutch magnet 85 is energized, causing engagement of the clutch 70 to effect a single revolution of the shaft 31. During the first half revolution of the shaft, the selected positioning pulley or pulleys, i.e., 53, 54, 55, 56, 92 and 93 are moved to the extremes of their throws to effectively lengthen or shorten the cables 21 and 28, thus concurrently rotating the print wheels and shifting the same axially until a selected type character is located opposite the print station. At such time, the cam follower arm 141 (FIG. 6) drops off the high point of cam 140, thereby causing a printing operation. Immediately thereafter, the cam 140 retracts the cam follower and actuator 48 to permit the print wheels to be rotated back to their initial positions and to be shifted back to their positions shown in FIG. 2 relative to the main printhead carriage 26. During such return movement, the cam 114 (FIG. 8) effects shifting of the carriage to its next character position.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A data printer comprising a flexible print wheel having an axis,
said wheel comprising a hub,
a substantially rigid rim having two sides which are at least substantially perpendicular to said axis, and
flexible means supporting said rim from said hub;
said rim having a plurality of type characters thereabout,
said rim having a plurality of detent formations thereabout,
means rotatably supporting said hub,
means for rotating said wheel to locate a selected one of said type characters at a printing station,
means engageable with certain of said formations on the side of said rim adjacent said printing station for aligning said selected type character with said printing station and for flexing said wheel transversely of its axis,
said flexing means comprising a hammer having a detent element engageable with a said detenting formation,
means for actuating said hammer, and
means for guiding said hammer along at least one of said sides of said rim and in a predetermined path whereby to impress said selected type character against a record medium located at said printing station.

2. A data printer comprising a shaft rotatable on a fixed axis,
a print wheel comprising a hub slideably keyed on said shaft for axial movement along said shaft,
a rim having two sides which are at least substantially perpendicular to said axis, and
flexible means supporting said rim from said hub,
said rim having a plurality of type characters therearound,
said rim having a plurality of detent formations therearound,
means for rotating said shaft whereby to locate a selected type character at a printing station,
an actuator engageable with said wheel,
means for moving said wheel and said actuator together into different positions along said axis,
said actuator comprising a pair of legs straddling the said sides of said rim,
each of said legs having a detent engageable with a said detent formation on the side of said rim adjacent said printing station and in any of said positions of said wheel and said actuator to flex said wheel transversely of said shaft whereby to print said selected type character against a record medium located at said printing station, and
means for guiding said actuator in a predetermined path.

3. A data printer according to claim 1 wherein said hammer is substantially U-shaped,
the legs of said hammer straddling the said sides of said rim,
each of said legs having a detent element engageable with a said detenting formation on the side of said rim adjacent said printing station.

References Cited

UNITED STATES PATENTS

| | | | |
|---|---|---|---|
| 441,257 | 11/1890 | Schuckers | 197—53 |
| 717,506 | 12/1902 | Quentell | 197—55 |
| 1,255,367 | 2/1918 | Welter | 197—6.4 |
| 1,453,867 | 5/1923 | Fanslow | 197—6.4 |
| 2,180,360 | 11/1939 | Krum et al. | 197—53 |
| 2,769,029 | 10/1956 | Howard | 197—55 |
| 2,818,801 | 1/1958 | Hart et al. | 101—110 X |
| 2,861,668 | 11/1958 | Beccio | 197—53 X |
| 2,870,897 | 1/1959 | Hubb | 197—18 |
| 2,900,848 | 8/1959 | Collins | 101—110 X |
| 2,951,439 | 9/1960 | Stutz et al. | 101—93 |
| 3,063,540 | 11/1962 | Howard | 197—49 |
| 3,169,474 | 2/1965 | Howard | 101—110 |

OTHER REFERENCES

IBM Technical Disclosure Bulletin, vol. 3, No. 6, November 1960, by N. Rodgers "Flexible Print Stock," p. 1.

ROBERT E. PULFREY, *Primary Examiner.*

E. S. BURR, *Assistant Examiner.*